United States Patent [19]

Salazar

[11] 4,432,799

[45] Feb. 21, 1984

[54] REFRACTORY COMPOSITIONS AND METHOD

[76] Inventor: Paul V. Salazar, 1506 Clinton Pl., River Forest, Ill. 60305

[21] Appl. No.: 355,320

[22] Filed: Mar. 8, 1982

[51] Int. Cl.$^3$ .................................................. C04B 9/04
[52] U.S. Cl. .................................... 106/85; 501/111
[58] Field of Search ............. 501/111; 106/85, DIG. 2

[56] References Cited

U.S. PATENT DOCUMENTS 3,923,534  12/1975  Cassidy ................................. 501/111
4,235,636  11/1980  Friedrichs et al. ................... 501/111

*Primary Examiner*—James Poer
*Attorney, Agent, or Firm*—Mason, Kolehmainen, Rathburn & Wyss

[57] ABSTRACT

A basic refractory composition includes a magnesium oxide source, aluminum phosphate and an insulating material selected from the group consisting of perlite, vermiculite, diatomaceous earth, and mixtures thereof in an amount of 5-60% based on the total weight of the composition. The composition provides excellent temperature resistance while retaining unexpected strength for a magnesium oxide based chemically bound refractory material having a substantial portion of insulating material.

6 Claims, No Drawings

4,432,799

REFRACTORY COMPOSITIONS AND METHOD

FIELD OF THE INVENTION

The present invention relates to chemically bonded refractory compositions and method and more particularly relates to chemically bonded refractory ramming mix compositions including an aluminum phosphate binder a portion of which forms in situ to provide a strong, chemically bonded, refractory composition. The refractory composition is particularly useful for linings in furnaces, hot metal ladies and other uses well known in the refractory art, particularly where high temperatures above 1500°–2000° F. are encountered. In accordance with one embodiment of the present invention, an insulating material, such as perlite, vermiculite or diatomaceous earth is included in the composition to provide greater heat insulating resistance to the refractory composition, while retaining unexpectedly good strength prior to ceramic bond formation. The refractory compositions of the present invention have unexpectedly long shelf lives and increased strength while in the plastic or wet state.

In accordance with another embodiment of the present invention, a dry, basic refractory material based upon magnesium oxide forms an in situ magnesium aluminum phosphate bond upon addition of water.

BACKGROUND OF THE INVENTION

Refractory ramming mix compositions containing a relatively high percentage of alumina chemically bound by phosphoric acid or an aluminum phosphate are well known in the art, particularly as described in the following patents: Salizar U.S. Pat. No. 3,547,664; Noda, et al. U.S. Pat. Nos. 3,958,582 and 3,891,009; Beeler U.S. Pat. No. 4,177,308; and Erskine U.S. Pat. No. 4,248,810. In some of these patents, an insulating material, such as perlite, is included to provide a light, temperature resistant refractory heat-insulating composition. The compositions generally are mixed to the consistency of a paste or mortar consistency so that the composition can be mixed, spread into a desired shape and sliced to form a slab of predetermined dimensions before the slices or slabs are rammed or pounded into place in a moist condition to physically and chemically form a monolithic refractory lining. The lining is then heated to drive off the moisture and heated at high temperature to form the final set or ceramic bond necessary in a refractory lining.

As set forth in my prior U.S. Pat. No. 3,547,664, two of the biggest problems in prior art high alumina ramming mixes are cracking upon drying and a need for higher strength at temperatures in which a mix must rely upon a chemical bond before the ceramic bond is formed. In accordance with my prior patent, I found that including ceramic fibers in an amount of about 2–6% by weight of clay in the mix provides a stronger ramming mix which does not crack upon drying.

Another problem with prior art high alumina ramming mixes, particularly prevalent in chemically bound ramming mixes, is the inability to provide a ramming mix which has a shelf life of more than about three weeks. After a chemically bound ramming mix is sliced to form a slab of predetermined dimensions, the ramming mix begins to dry as a result of ambient conditions and, particularly, where a chemical binder such as aluminum phosphate is being formed in situ such as described in my prior U.S. Pat. No. 3,547,664, where phosphoric acid reacts with alumina to form the aluminum phosphate binder. This in situ reaction between phosphoric acid and alumina is exothermic resulting in moisture being driven away from the ramming mix. The ramming mix must be moist when rammed or pounded into position as a lining and, therefore, ramming mixes of the prior art generally have had a shelf life of about three weeks or less. Liquid aluminum phosphate has been added as the chemical binder in some prior art refractory ramming mixes and, generally, since these refractory ramming mixes do not depend upon an in situ reaction for the formation of the aluminum phosphate binder, it has been found that the shelf life problem is not as severe. However, no prior art refractory ramming wires using a chemical binder will remain sufficiently wet for ramming or pounding into place significantly more than about three weeks.

SUMMARY OF THE INVENTION

In accordance with one embodiment of the present invention, suprisingly it has been found that refractory compositions based upon alumina or aluminum silicate chemically bound by aluminum phosphate have a shelf life of three months to more than one year where the composition includes both liquid aluminum phosphate and phosphoric acid to form a portion of the aluminum phosphate binder in situ. In accordance with another embodiment of the present invention, increased strength is achieved by including alumina, and an aluminum silicate bearing material, such as clay, in the refractory composition to form the in situ aluminum phosphate bond from the reaction of phosphoric acid and aluminum silicate. The aluminum phosphate should be provided in the composition in an amount of about 5% to about 70% by weight of the bone dry composition and the phosphoric acid should be included in an amount in the range of about 1% to about 10% based on the weight of the bone dry composition to provide the suprisingly new and unexpected shelf life to the refractory composition. It has been found that the phosphoric acid will partially react with the alumina or aluminum silicate of the refractory composition and partially provide wetting to the refractory ramming mix. The phosphoric acid wetting does not deleteriously effect the aluminum phosphate chemical binder. In fact, suprisingly, it has been found that greater strength is achieved in the refractory composition when both the aluminum phosphate and the phosphoric acid are included together than in prior art refractory composition utilizing the aluminum phosphate binder which is added either as aluminum phosphate or as phosphoric acid for reaction with alumina in situ. Accordingly, suprisingly longer shelf lives and suprisingly greater crushing strengths are achieved by including both aluminum phosphate and phosphoric acid, in the amounts specified, in the refractory ramming mix.

In accordance with another embodiment of the present invention, the aluminum phosphate and phosphoric acid together are particularly useful in a refractory ramming mix composition containing a heat insulator such as perlite, vermiculite, diatomaceous earth, expanded clay, flourspar, or an additive which is intended to be burned out to leave a void space at the intended use of the refractory, such as wood flour, sawdust, burnable fibers and the like. Refractory ramming mixes containing at least 5% of such an insulating component inherently are weaker, but are unexpectedly strengthened in accordance with the present invention by including both aluminum phosphate and phosphoric acid chemical binders.

Accordingly, an object of the present invention is to provide a refractory material based on alumina, aluminum silicate or mixtures thereof having a much longer shelf life than similar prior art refractory materials.

Another object of the present invention is to provide a refractory material based upon alumina, aluminum silicate or mixtures thereof which retains its plasticity or workability for unexpectedly long periods of time before curing.

Another object of the present invention is to provide a refractory ramming mix based upon alumina, aluminum silicate or mixtures thereof wherein part of the binder is included in the refractory mix as aluminum phosphate and a portion of the binder is added as phosphoric acid for reaction in situ as the ramming mix is cured to provide a stronger refractory material having a longer shelf life.

Another object of the present invention is to provide a refractory, insulating material based upon alumina, aluminum silicate or mixtures thereof and including an insulating material selected from the group consisting of perlite, vermiculite, diatomaceous path, expanded clay and mixtures thereof.

Another object of the present invention is to provide a refractory ramming mix based upon alumina, aluminum silicate or mixtures thereof including expanded clay and a material such as perlite, vermiculite, sawdust or other material which will burn out at the temperature encountered in the environment of use leaving voids in the refractory material for the purpose of insulation to provide a refractory capable of withstanding temperatures of 2500°-3500° F. while retaining unexpectedly superior strength characteristics.

Another object of the present invention is to provide a dry method and refractory article based upon magnesium oxide or mixtures of magnesium oxide with chrome ores to provide a basic refractory material.

Another object of the present invention is to provide a basic refractory material based upon magnesium oxide or mixtures of magnesium oxide with chrome materials which can be mixed with water at the job site to provide a plastic or pastey consistency so that the basic refractory material can be trowled or otherwise suitably applied in place to act as a lining for a furnace or other high temperature environment thereby forming a magnesium aluminum phosphate chemical bond in situ.

DETAILED DESCRIPTION OF THE INVENTION

In accordance with the present invention, a refractory ramming mix having a plastic or pastey consistency chemically bonded by a combination of liquid aluminum phosphate and an in situ binder formed by the reaction of phosphoric acid and alumina or an aluminum silicate bearing material, such as bentonite clay, is capable of withstanding temperatures in the area of 2,000°-3,500° F. The plastic, chemically bonded refractory ramming mix has a suprisingly unexpected shelf life in the range of 3 months to more than one year and is stronger than prior art refractory ramming mixes which utilize either prereacted aluminum phosphate or the in situ reaction of phosphoric acid with alumina or aluminum silicate.

In accordance with an important embodiment of the present invention, the plastic refractory composition includes an insulating material such as perlite, vermiculite, or diatomaceous earth to provide an insulating, refractory plastic composition containing both liquid aluminum phosphate and a in situ reaction product binder formed from the reaction of phosphoric acid with alumina or an aluminum silicate containing material such as clay. It has been found that both increased shelf life and increased strength are achieved in accordance with the present invention, even with the inclusion of a substantial percentage, for example 5-60%, of the insulating material. Higher temperature resistance can be achieved by using what is commonly known as bubble alumina—an alumina containing void spaces or air pockets therein, or mixing a burnable material, such as sawdust, with alumina or aluminum silicate so that when fired, the burnable material contained in the alumina or aluminum silicate will pyrolyze leaving void spaces to increase its insulating properties.

In accordance with one embodiment of the present invention, the refractory composition includes liquid aluminum phosphate in an amount of 5-70%; a refractory material comprising alumina, aluminum silicate or mixtures thereof in an amount of 2-94%; and phosphoric acid in an amount of 1-10% by weight of the total composition. Surprisingly, it has been found that this refractory composition using both liquid aluminum phosphate and phosphoric acid has unusually long, unexpected shelf lives of 3 months to more than 1 year as a result of the chemical bonding being formed partially in situ as the reaction product of the free phosphoric acid with the alumina or aluminum silicate refractory material. The shelf life is not only unexpectedly increased, but the product is stronger than if the refractory material is chemically bonded by aluminum phosphate alone or by completely forming the bond in situ by reaction of phosphoric acid with alumina or alumina silicate. It would be expected that the partial in situ binding as a result of the reaction between phosphoric acid and alumina or aluminum silicate would cause a decrease in the shelf life of the refractory ramming mix since the reaction is exothermic and would inherently drive off some of the moisture from the ramming mix slab. However, unexpectedly, the ramming mix composition of this embodiment of the present invention has unexpectedly long shelf lives of three months to more than one year. In fact, one test sample remains in a rammable or poundable plastic consistency after being sliced to predetermined dimensions more than one year ago.

It is theorized that the liquid aluminum phosphate and the lquid phosphoric acid combine to provide a unique and unexpected wetting action to the refractory compositions of the present invention enabling the refractory ramming composition to remain wet and suitable for ramming into position for unexpected periods of time. Liquid aluminum phosphate alone, or phosphoric acid alone for in situ reaction to provide aluminum phosphate, provide shelf lives of at most about 3 weeks. Additionally, the combination of both aluminum phosphate and phosphoric acid provide a stronger product apparently resulting from the in situ partial bond by the reaction of phosphoric acid with either alumina or aluminum silicate. In either case, the reaction produces an in situ aluminum phosphate bond. Phosphoric acid in an amount of at least one percent should be included in the refractory ramming mix in order to achieve the in situ bonding and the unexpected shelf life and strength in the refractory product while more than 10% phosphoric acid may create a supersaturated mix which is difficult or impossible to cure.

In accordance with another important feature of the present invention, it is unnecessary to add any water to the refractory ramming mix. Water may be added in an amount of 1-20% of the total weight of the composition if it is necessary in order to achieve a proper consistency or workability so that a plastic or pasty commposition can be spread to a desired shape, but the liquid aluminum phosphate and the free phosphoric acid contained in the refractory composition of the present invention is generally sufficient to provide the proper consistency and workability, particularly where the aluminum phosphate is contained in the composition in an amount in the range of 20-70% by weight.

Generally, some water in an amount for example 1% by weight of the total composition is introduced into the mix with the phosphoric acid but it is otherwise unnecessary to add water for the purpose of plasticity or workability in the composition. It has been found that the addition of water in the composition of the present invention will result in a somewhat weaker product due to voids contained in the refractory material upon release of the water from the ramming mix, although voids may add further insulating characteristics to the refractory composition. Other refractory granular materials or ceramic fibers may be added to the composition of the present invention for economic reasons or to improve the strength of the composition.

The alumina utilized in accordance with the composition of the present invention is a granular processed alumina which is relatively pure $Al_2O_3$. The alumina may be tabular to achieve a denser product or calcined alumina and may include bubble alumina having a higher insulating value. For higher temperature resistance the alumina may be less dense calcined alumina generally having a density on the order of 80-100 lbs. per cubic foot, but since calcined alumina is not normally commercially available in coarser grain sizes, it is generally preferred to include a mixture of tabular alumina and calcined alumina, as disclosed in my prior U.S. Pat. No. 3,547,664. Generally, for the purpose of the present invention, higher temperature resistance can be achieved if at least a portion of the alumina has a particle size of −325 mesh.

Clay is useful in accordance with the composition of the present invention to aid in providing the requisite plasticity and workability necessary for ramming and also may be used as a source of aluminum silicate for reaction with the phosphoric acid to provide the in situ aluminum phosphate binder. Any of the plastic clays or any other source of aluminum silicate may be used in accordance with the principles of the present invention. Generally, some clay should be present in order to provide a thickening of the refractory composition to a pasty or mortar-like consistency. Kaolin clay, ball clay, bentonite and the like serve as thickening agents in the initial sheeting out of the refractory commposition of the present invention to a desired shape and, during curing, the clay or other source of aluminum silicate will react with the free phosphoric acid in the mix to provide in situ bonding thereby achieving unexpectedly long shelf lives and strength in the compositions of the present inventions.

To achieve the full advantage of the present invention, clay should be included in the refractory composition in an amount in the range of about 1 to about 30% by weight of the total composition to provide thickening and an aluminum silicate source for reaction with the phosphoric acid. Other aluminum silicates may be used for reaction with phosphoric acid to provide the aluminum phosphate in situ binder. The phosphoric acid included in the composition of the present invention reacts not only with the alumina or aluminum silicate refractory material but also with the clay component, when present, giving a stronger bond to the product.

After the refractory composition of the present invention is spread into a desired shape and sliced to predetermined dimensions, the clay or other source of aluminum silicate begins to react with the phosphoric acid. Once the refractory slabs or slices are rammed or pounded into place, the material is heated to a temperature of at least 450° F. to complete the reaction between the aluminum silicate or clay and the phosphoric acid, to dry the refractory material and to irreversibly set the phosphoric acid-aluminum silicate reaction. Thereafter the material is fused at a temperature of about 4,000° F. to create the ceramic bond.

It has been found that by including an insulating material in the refractory composition of the present invention, an exceptionally high temperature resistance can be imparted to the composition while providing a composition with excellent strength and shelf life. The following examples show exemplary refractory material compositions having temperature resistance at various, indicated levels. The percentages indicated in the examples are percent by weight of the total composition:

| EXAMPLE 1 - 2000° F. | |
|---|---|
| Liquid aluminum phosphate | 5-70% |
| Aluminum silicate | 10-89% |
| Phosphoric acid | 1-10% |
| Perlite, vermiculite or diatomaceous earth | 5-40% |
| EXAMPLE 2 - 2500° F. | |
| Liquid aluminum phosphate | 5-70% |
| Alumina | 20-88% |
| Phosphoric acid | 1-10% |
| Perlite, vermiculite or diatomaceous earth | 5-40% |
| Fibers burnable below 2500° F., for example, cotton or polyester fibers | 5-20% |
| EXAMPLE 3 - 3000° F. | |
| Liquid aluminum phosphate | 5-70% |
| Alumina | 25-88% |
| Phosphoric acid | 1-10% |
| Expanded clay, i.e. bentonite | 1-30% |
| Perlite, vermiculite or diatomaceous earth | 5-40% |
| EXAMPLE 4 - 3000° F. | |
| Liquid aluminum phosphate | 5-70% |
| Bubble alumina and expanded clay i.e. bentonite, in weight proportions of 1:2 to 2:1 | 25-88% |
| Phosphoric acid | 1-10% |
| Perlite, vermiculite or diatomaceous earth fibers burnable below 3000° F. | 5-20% |
| Kaolin, ball clay or mixtures | 1-30% |
| EXAMPLE 5 - 3500° F. | |
| Liquid aluminum phosphate | 5-70% |
| Bubble alumina | 10-78% |
| Finely ground alumina (−325 mesh) | 10-78% |
| Phosphoric acid | 1-10% |
| Perlite, vermiculite or diatomaceous earth | 5-40% |
| Bentonite | 1-30% |
| EXAMPLE 6 | |
| Liquid aluminum phosphate | 50% |
| Alumina −100 Mesh | 7% |
| −325 Mesh | 7% |
| Phosphoric acid (80% $H_3PO_4$) | 2% |
| Expanded Kaolin Clay | 15% |
| Expanded perlite* | 16% |
| Bentonite | 1% |
| Ball clay | 2% |

-continued

|  | *—10 Mesh | —20 Mesh | —200 Mesh |
|---|---|---|---|
| Perlite | 8% | 4% | 4% |

EXAMPLE 7

| Liquid aluminum phosphate | 35% |
|---|---|
| Alumina —100 Mesh | 5% |
| —325 Mesh | 10% |
| Phosphoric acid (80% $H_3PO_4$) | 5% |
| Expanded Kaolin Clay | 10% |
| Expanded perlite* | 10% |
| Bentonite | 15% |
| Ball clay | 10% |

|  | *—10 Mesh | —20 Mesh | —200 Mesh |
|---|---|---|---|
| Perlite | 2% | 6% | 2% |

EXAMPLE 8

| Liquid aluminum phosphate | 40% |
|---|---|
| Alumina —100 Mesh | 10% |
| —325 Mesh | 10% |
| Phosphoric acid (80% $H_3PO_4$) | 4% |
| Expanded perlite* | 20% |
| Expanded ball clay | 8% |
| Clay - Bentonite | 2% |
| - Ball clay | 1% |
| Ceramic fibers | 5% |

|  | *—10 Mesh | —20 Mesh | —200 Mesh |
|---|---|---|---|
| Perlite | 5% | 5% | 10% |

In accordance with another important embodiment of the present invention, a basic refractory composition is prepared based upon magnesium oxide, magnesite, dolomite, chromemagnesite, or mixtures thereof to form a basic refractory material chemically bound with aluminum phosphate which reacts with the magnesium oxide when wet to form magnesium aluminum phosphate.

In accordance with an important feature of this embodiment of the present invention, it has been found that the refractory composition can be initially made in a dried form prior to the addition of the water so that shelf life is not a problem with the $M_gO$ based composition of the present invention. In accordance with this embodiment of the present invention, the aluminum phosphate is added to the composition in dried form. For example, phosphoric acid may be reacted with an aluminum silicate clay, for example bentonite, and the reacted clay dried at a temperature at about 300–600° F. to remove substantially all moisture. Dried magnesite or other dried magnesium oxide containing material can be added to the composition together with any other fillers, insulating materials and the like and water can be added to the composition at the job site in an amount suitable for proper consistency and workability prior to troweling or otherwise suitably applying the composition as a liner, industrial furnace cover and the like. Suitable examples of basic refractory compositions of the present invention, based upon $M_gO$, are as follows:

EXAMPLE 9

| Dried aluminum phosphate | 5–70% |
|---|---|
| A dried source of magnesium oxide, for example magnesite, chrome magnesite, dolomite or mixtures thereof | 20–96% |
| Clay | 1–30% |

EXAMPLE 10

| Dried aluminum phosphate | 5–70% |
|---|---|
| Dried magnesium oxide source of Example 6 | 20–93% |
| Clay | 1–30% |
| Phosphoric acid (the phosphoric acid can be added at the time of water addition) | 1–10% |

EXAMPLE 11

| Dried aluminum phosphate | 5–70% |
|---|---|
| Dried magnesium oxide source of Example 6 | 20–89% |
| Clay | 1–30% |
| Perlite, vermiculite or diatomaceous earth | 5–40% |

EXAMPLE 12

| Dried aluminum phosphate | 5–70% |
|---|---|
| Dried magnesium oxide source of Example 6 | 20–84% |
| Expanded clay, i.e. bentonite | 1–30% |
| Perlite, vermiculite or diatomaceous earth | 5–40% |
| Fibers burnable below 2000° F. | 5–20% |

Water is added to the basic $M_gO$ based refractory compositions of the present invention in an amount of 1–20% by weight of the dried composition to provide a plastic or workable basic refractory composition and the reaction between aluminum phosphate and the $M_gO$ to form a magnesium aluminum phosphate bond. Phosphoric acid can be added to the basic $M_gO$ based composition to provide greater strength, but generally shelf life increase is not of consequence in the $M_gO$ based refractory since it will be wetted at the job site and immediately disposed in place. Further, if phosphoric acid is added together with the aluminum phosphate during manufacture of the basic dry composition, the phosphoric acid and aluminum phosphate should be dry prior to the addition of magnesium oxide to prevent initiation of the reaction.

It has been found that when a insulating material such as perlite, vermiculite or diatomaceous earth is included in the composition in an amount of at least 5% by weight of the total composition, the refractory composition should not be in direct contact with a liquid metal due to the lower density of the insulating, refractory compositions. However, temperatures up to about 3500° F. do not deliteriously affect suitable refractory compositions of the present invention.

The refractory compositions of the present invention are useful in essentially all of the uses well known in the refractory art, particularly when an insulating material is included for temperature environments over 2000° F. Examples of suitable applications for the refractory materials of the present invention include original furnace liners, soaking pit walls, reheat furnace walls and roof liners, induction furnace covers, as a back-up lining for the aforementioned applications to act as an insulating lining behind a prior art refractory lining; refractory linings for boilers, and linings for forging furnaces. Other uses will be apparent to those skilled in the refractory art.

I claim:

1. A basic refractory composition which, when wetted, forms a magnesium aluminum phosphate bond comprising:
   A magnesium oxide source: 20–94%;
   Aluminum phosphate: 5–70%; and
   an insulating material selected from the group consisting of perlite, vermiculite, diatomaceous earth, and mixtures thereof in an amount of 5–60% based on the total weight of the composition.

2. The composition of claim 1 wherein said magnesium oxide source is selected from the group consisting of magnesium oxide, magnesite, dolomite, chrome magnesite, and mixtures thereof.

3. A method of manufacturing a basic refractory composition comprising:

mixing dried aluminum phosphate, a source of dried magnesium oxide, a source of aluminum silicate and an insulating material selected from the group consisting of perlite, vermiculite, diatomaceous earth and mixtures thereof in an amount of 5–60% based on the total weight of the composition to form a dry refractory composition; and then adding water to said dried refractory composition to initiate a reaction between said aluminum phosphate and said magnesium oxide to form a magnesium aluminum phosphate bond.

4. The method of claim 3 further including mixing with said aluminum phosphate and said magnesium oxide an insulating material selected from the group consisting of perlite, vermiculite and diatomaceous earth in an amount of 5–40% based on the total weight of aluminum phosphate, magnesium oxide and insulating material.

5. The method of claim 3 wherein said magnesium oxide source is selected from the group consisting of magnesium oxide, magnesite, dolomite, chrome magnesite, and mixtures thereof.

6. The method of claim 3 further including reacting phosphoric acid with an aluminum silicate to form an aluminum phosphate reaction product, and drying said aluminum phosphate reaction product to provide said dried aluminum phosphate.

* * * * *